(12) United States Patent
Nordbruch

(10) Patent No.: US 10,655,972 B2
(45) Date of Patent: May 19, 2020

(54) METHOD AND DEVICE FOR OPERATING A VEHICLE AND A PARKING FACILITY RESPECTIVELY

(71) Applicant: Robert Bosch GmbH, Stuttgart (DE)

(72) Inventor: Stefan Nordbruch, Kornwestheim (DE)

(73) Assignee: Robert Bosch GmbH, Stuttgart (DE)

(*) Notice: Subject to any disclaimer, the term of this patent is extended or adjusted under 35 U.S.C. 154(b) by 439 days.

(21) Appl. No.: 15/519,436

(22) PCT Filed: Oct. 22, 2015

(86) PCT No.: PCT/EP2015/074483
§ 371 (c)(1),
(2) Date: Apr. 14, 2017

(87) PCT Pub. No.: WO2016/083035
PCT Pub. Date: Jun. 2, 2016

(65) Prior Publication Data
US 2017/0254654 A1   Sep. 7, 2017

(30) Foreign Application Priority Data
Nov. 24, 2014  (DE) .................. 10 2014 224 104

(51) Int. Cl.
*G01C 21/34*  (2006.01)
*G08G 1/14*  (2006.01)
(Continued)

(52) U.S. Cl.
CPC ......... *G01C 21/3415* (2013.01); *B60W 30/06* (2013.01); *B62D 15/0285* (2013.01);
(Continued)

(58) Field of Classification Search
CPC .. G01C 21/3415; G01C 21/206; G01C 21/32; G01C 21/36; B60W 30/60; B60W 30/06;
(Continued)

(56) References Cited

U.S. PATENT DOCUMENTS

2001/0019309 A1   9/2001  Saeki et al.
2012/0188100 A1   7/2012  Min et al.
(Continued)

FOREIGN PATENT DOCUMENTS

CN   101086784 A   12/2007
CN   102407848 A   4/2012
(Continued)

OTHER PUBLICATIONS

International Search Report dated Jan. 27, 2016, of the corresponding International Application PCT/EP2015/074483 filed Oct. 22, 2015.
(Continued)

*Primary Examiner* — John A Tweel, Jr.
(74) *Attorney, Agent, or Firm* — Norton Rose Fulbright US LLP; Gerard Messina

(57) ABSTRACT

A method for operating a vehicle, in which a digital map of a parking facility and at least one target position in the parking facility are received by the vehicle via a communication network, positional data of one or more mobile object(s) located within the parking facility are received by the vehicle via the communication network, the vehicle navigates autonomously in the parking facility to the target position based on the digital map and the positional data of the one or the plurality of mobile object(s), and the vehicle parks itself autonomously at the target position. A device for operating a vehicle, a device and a method for operating a parking facility, and a computer program, are also described.

16 Claims, 2 Drawing Sheets

(51) Int. Cl.
*G08G 1/16* (2006.01)
*B60W 30/06* (2006.01)
*G08G 1/0968* (2006.01)
*G09B 29/00* (2006.01)
*B62D 15/02* (2006.01)
*G01C 21/32* (2006.01)
*G05D 1/02* (2020.01)
*G09B 29/10* (2006.01)
*G01C 21/20* (2006.01)
*G01C 21/36* (2006.01)
*G06Q 90/00* (2006.01)

(52) U.S. Cl.
CPC .......... *G01C 21/206* (2013.01); *G01C 21/32* (2013.01); *G05D 1/028* (2013.01); *G05D 1/0274* (2013.01); *G08G 1/096844* (2013.01); *G08G 1/096855* (2013.01); *G08G 1/143* (2013.01); *G08G 1/146* (2013.01); *G08G 1/163* (2013.01); *G08G 1/164* (2013.01); *G09B 29/007* (2013.01); *G09B 29/10* (2013.01); *G01C 21/36* (2013.01); *G05D 2201/0213* (2013.01); *G06Q 90/20* (2013.01); *G06Q 2240/00* (2013.01)

(58) Field of Classification Search
CPC ............. G08G 1/143; G08G 1/096844; G08G 1/096855; G08G 1/146; G08G 1/163; G08G 1/164

USPC ...................................................... 340/932.2
See application file for complete search history.

(56) References Cited

U.S. PATENT DOCUMENTS

2012/0262305 A1   10/2012  Woodard et al.
2014/0046506 A1*  2/2014   Reichel .............. B62D 15/0285
                                                        701/2
2015/0286219 A1* 10/2015   Reichel ................ G08G 1/0965
                                                        701/23

FOREIGN PATENT DOCUMENTS

| | | |
|---|---|---|
| CN | 103186987 A | 7/2013 |
| CN | 103714716 A | 4/2014 |
| DE | 102009029117 A1 | 3/2011 |
| DE | 102012015968 A1 | 3/2014 |
| DE | 102012021282 A1 | 4/2014 |
| DE | 102012222562 A1 | 6/2014 |
| JP | H10269497 A | 10/1998 |

OTHER PUBLICATIONS

Ibisch Andre et al: "Towards Highly Automated Driving in a Parking Garage: General Object Localization and Tracking Using an Environment-Embedded Camera System", 2014 IEEE Intelligent Vehicles Symposium Proceedings, IEEE, Jun. 8, 2014 (Jun. 8, 2014), pp. 426-431, XP032620322.

* cited by examiner

METHOD AND DEVICE FOR OPERATING A VEHICLE AND A PARKING FACILITY RESPECTIVELY

FIELD

The present invention relates to a method and a device for operating a vehicle. The present invention furthermore relates to a device and a method for operating a parking facility. In addition, the present invention relates to a computer program.

BACKGROUND INFORMATION

German Patent Application No. DE 10 2012 222 562 A1 describes a system for managed parking facilities, for transferring a vehicle from a starting position to a target position.

For the autonomous navigation of the vehicle from the starting position to the target position, it is usually important for the vehicle to identify mobile objects or obstacles located in its environment. Such mobile or dynamic objects are actually able to be detected by an on-board environmental sensor system of the vehicle. Nevertheless, a few dynamic objects such as a child running from between two parked vehicles are difficult to detect, and/or can be detected only too late by the sensors of the environmental sensor system.

SUMMARY

An object of the present invention includes providing a method for operating a vehicle that makes it possible to reduce or even avoid a collision risk of the vehicle with mobile objects located in the parking facility while the vehicle is navigating autonomously in the parking facility.

An object of the present invention is also to provide a corresponding device for operating a vehicle.

An object of the present invention is also to provide a method for operating a parking facility.

An object of the present invention is also to provide a corresponding device for operating a parking facility.

An object of the present invention is also to provide a corresponding computer program.

Advantageous further refinements of the present invention are described herein.

According to one aspect of the present invention, a method for operating a vehicle is provided, in which
  a digital map of a parking facility and at least one target position in the parking facility are received by the vehicle via a communication network,
  positional data of one or more mobile object(s) located within the parking facility are received by the vehicle via the communication network,
  the vehicle navigates autonomously to the target position in the parking facility based on the digital map and the positional data of the one or the plurality of mobile object(s), and
  the vehicle parks itself autonomously at the target position.

According to another aspect, a device for operating a vehicle is provided, which includes:
  a communication interface, which is designed to receive a digital map of a parking facility and a target position in the parking facility via a communication network,
  the communication interface furthermore being designed to receive positional data of one or more mobile object(s) located within the parking facility via the communication network, and
  a guidance device, which is designed to guide the vehicle autonomously to the target position in the parking facility based on the digital map and the positional data of the mobile object(s), and to park the vehicle autonomously at the target position.

According to a still further aspect, a device for operating a parking facility is provided, which includes
  a vehicle-external monitoring device for monitoring the parking facility,
  a processor, which is designed to detect one or more mobile object(s) within the parking facility based on the monitoring, to determine a position of the mobile object(s), and to ascertain positional data corresponding to the position,
  a communication interface, which is designed to transmit a digital map of the parking facility and the positional data via a communication network to a user of the communication network.

According to a specific embodiment, the communication interface of the device for operating a parking facility is developed to receive positional data of one or a plurality of object(s) located within the parking facility via the communication network.

According to yet another aspect, a method for operating a parking facility is provided,
  in which the parking facility is monitored,
  based on the monitoring, one or a plurality of mobile object(s) is/are detected within the parking facility, a position of the mobile object(s) is determined, and positional data corresponding to the position are ascertained,
  and a digital map of the parking facility and the positional data are transmitted via a communication network to a user of the communication network.

According to a specific embodiment of the method for operating a parking facility, positional data of one or more mobile object(s) located within the parking facility are received via the communication network.

According to an additional aspect, a computer program is provided, which includes program code for executing the method for operating a vehicle and/or the method for operating a parking facility when the computer program is executed on a computer.

According to one aspect, a parking system for vehicles is provided, the parking system including a parking facility and the device for operating a parking facility.

Thus, the present invention, among other things, specifically encompasses transmitting positional data that are allocated to mobile objects within the parking facility to the vehicle and/or to a user of the communication network. Based on the knowledge of where mobile objects are located within the parking facility, an autonomous navigation of the vehicle is able to be carried out in an efficient and safe manner. For example, even mobile or dynamic objects that an environmental sensor of an environmental sensor system of the vehicle is able to detect only with difficulty and/or too late or even not at all may be taken into account in the autonomous navigation. This advantageously reduces or even completely avoids a collision risk of the vehicle with mobile objects that are located inside the parking facility.

A mobile object within the meaning of the present invention may also be referred to as a dynamic object. A stationary object within the meaning of the present invention may also be called a static object. Static objects, for example, are part of an infrastructure of the parking facility. For example, such an infrastructure includes a barrier, a building, a pylon or curbstone edges. Mobile or dynamic objects, for example, are persons, animals or other vehicles that are moving inside the parking facility. For example, a dropped-off or a parked vehicle is defined as a mobile object although it is not moving inasmuch as it has a speed that amounts to 0 m/s while parking. Despite the fact that an infrastructure of the parking facility also has a speed of 0 m/s, this infrastructure is not defined as a mobile object but rather as a static object. The reason for this is that a vehicle may exhibit a speed greater than 0 m/s, i.e., has the ability to move. The infrastructure of the parking facility does not. Therefore, it is provided, for example, that the static objects include the infrastructure of the parking facility exclusively.

In other words, a mobile object denotes an object that is able to move or ambulate, i.e., may move. Thus, an object need not necessarily move in order to be defined or classified as a mobile object. In contrast, a static object denotes an object that is unable to move, i.e., is immovable.

A parking facility within the meaning of the present invention may also be referred to as a parking lot and serves as a parking area for vehicles. Thus, the parking facility in particular forms a continuous area that has a plurality of parking spaces (in case of a parking facility on private property) or parking spots (in case of a parking facility on public property). According to a specific embodiment, the parking facility may be encompassed by a car park. More specifically, the parking facility is encompassed by a garage.

In fully automated or fully-automatic (autonomous) valet parking, a driver drops off his vehicle at a drop-off point or a drop-off position, e.g., in front of a parking garage, and from there the vehicle drives on its own, i.e., autonomously, or in a remote-controlled manner, into a parking position or into a parking bay, and from there back again to the drop-off point. The driver need not remain inside the vehicle for this purpose, but is free to do so.

Autonomous within the meaning of the present invention in particular means that the vehicle navigates on its own, i.e., without an intervention by a driver. The vehicle thus drives by itself or autonomously onto the parking facility without a driver having to steer the vehicle for this purpose. In other words, the driver himself need no longer remain inside the vehicle. This means, in particular, that the vehicle includes a guidance device for the vehicle navigation, which is developed to guide or steer the vehicle autonomously onto the parking facility. A guidance or a control in particular includes a lateral and/or linear guidance or control of the vehicle. Such an autonomously driving vehicle that is able to park and leave a parking position automatically is referred to as an AVP vehicle, for example. AVP stands for "automatic valet parking" and may be translated as "automatic parking operation".

According to a specific embodiment, the vehicle is an AVP vehicle.

According to another specific embodiment, the communication network includes a WLAN and/or a mobile telephony network.

A drop-off position or a drop-off point within the meaning of the present invention is a position at which a driver of the vehicle is able to drop off the vehicle for an autonomous or remote-controlled parking operation and from where the driver can pick up the vehicle again at a later point in time.

A parking position within the meaning of the present invention is a position at which the vehicle is to park autonomously. A parking position includes a parking bay, for example.

In a specific embodiment, it is provided that the vehicle navigates in an autonomous or a remote-controlled manner from the drop-off position to the parking position.

In another specific embodiment, it is provided that the vehicle parks in the parking position autonomously or is parked in the parking position in a remote-controlled manner.

According to another specific embodiment, it is provided that the vehicle unparks from the parking position autonomously or in a remote-controlled manner.

In an additional specific embodiment, it is provided that the vehicle navigates or drives from the parking position to the drop-off position autonomously or in a remote-controlled manner.

According to a specific embodiment, the communication via the communication network takes place in encrypted form.

According to a specific embodiment, it is provided that the vehicle receives prediction data of future movements of the mobile objects allocated to the mobile object(s) via the communication network, so that the vehicle navigates autonomously in the parking facility based on the future movements of the mobile object(s).

This offers the specific technical advantage that an improved and more efficient navigation of the vehicle in the parking facility is possible inasmuch as future movements of the mobile objects may now be taken into account as well for the navigation, i.e., for the route planning, in particular. This may advantageously reduce a collision risk with the mobile objects or even avoid that risk completely.

According to a further specific embodiment, it is provided that the vehicle senses its environment, and when a mobile object is detected based on the sensing, the vehicle determines a position of the mobile objects and transmits positional data corresponding to the position via the communication network to a user of the communication network.

This provides the specific technical advantage that the user of the communication network obtains knowledge of the locations of mobile objects within the parking facility. Accordingly, the user of the communication network may then adapt his autonomous navigation inside the parking facility. This may advantageously reduce or even completely eliminate a collision risk of the user with mobile objects that are located in the user's environment.

In another specific embodiment, it is provided that the vehicle transmits positional data that correspond to its current position via the communication network to a user of the communication network while the vehicle is navigating within the parking facility.

This provides the specific technical advantage that the user obtains knowledge of where the vehicle is located during the navigation of the vehicle in the parking facility. Accordingly, this user is then able to adapt his/her navigation within the parking facility. This, too, is able to reduce a collision risk in an advantageous manner.

In another specific embodiment, it is provided that during its navigation in the parking facility, the vehicle transmits route data corresponding to its scheduled route via the communication network to a user of the communication network.

This provides the specific technical advantage that the user obtains knowledge of the particular route that the vehicle has planned within the scope of the navigation and will therefore also use. Thus, this route is a setpoint trajectory that the vehicle intends to follow. The user may then appropriately adapt his or her navigation in the parking facility. This may advantageously reduce a collision risk.

A user within the meaning of the present invention in particular is the vehicle itself or another vehicle or the device for operating a vehicle or the device for operating a parking facility. The user in particular is a terminal device, preferably a mobile terminal device. For example, the terminal device is installed in the vehicle. A plurality of users is preferably provided, which have identical or different forms, for example.

In another specific embodiment, it is provided that the data allocated to the mobile object(s) are encompassed by a dynamic layer of the digital map, and that the digital map has a static layer, which includes positional data of one or more stationary object(s) located within the parking facility.

In other words, the digital map has a static layer and a dynamic layer. The static layer includes the static components of a digital map, which here are especially the stationary objects, i.e., in particular information about these static objects. Such information, for example, are positions and/or dimensions or measurements of the static objects. The dynamic layer of the digital map in particular includes the dynamic or mobile components of the digital map, in this case, in particular the mobile objects, i.e., information about the mobile objects. Information about the mobile objects includes positions, future routes or movements of the mobile objects, for example, and/or the type (vehicle, person, animal, . . . ) of mobile object(s).

By subdividing the digital map into a dynamic and a static layer, it is advantageously possible to transmit or send only the dynamic layer to the vehicle, i.e., generally to the user of the communication network, if a change has occurred in the mobile objects. The static layer, which will usually not change in the course of the navigation, must therefore not be transmitted again to the user, in particular to the vehicle.

This advantageously reduces a data volume to be transmitted and thus makes for an efficient use of a transmission bandwidth or a transmission capacity of the communication network.

In an alternative specific embodiment, it is provided that the data allocated to the mobile object(s) are included in an additional digital map, the digital map including positional data of one or more stationary object(s) located within the parking facility.

In other words, two digital maps are provided according to this alternative specific embodiment: the digital map that includes information, especially positional information, of the stationary objects, and the additional digital map that includes information, in particular the positional data, of the mobile objects. Here, too, the digital map that includes the stationary or static components must be sent to the vehicle only once, generally to the user, in particular. The additional digital map that includes the dynamic components may be retransmitted to the user, in particular to the vehicle, on a need-based basis, i.e., especially when a change with regard to the mobile objects has taken place. This, too, advantageously reduces a data volume to be transmitted. Especially a transmission capacity and/or a transmission bandwidth of the communication network is/are utilized in an especially efficient manner.

According to another alternative specific embodiment, a single digital map exists exclusively, which includes a single layer that encompasses both the dynamic components and the static components. In other words, according to an alternative specific embodiment, it is provided that the digital map includes a single layer, which holds the data allocated to the mobile object(s) as well as the positional data of one or more stationary object(s) located within the parking facility.

In a specific embodiment, it is provided that the dynamic layer includes multiple dynamic sub-layers (i.e., is subdivided into a plurality of dynamic sub-layers, in particular); one of the sub-layers includes data that are allocated to mobile objects having a speed of 0 m/s (e.g., parked or dropped-off vehicles), and another one of the sub-layers includes data that are allocated to mobile objects that have a speed greater than 0 m/s (e.g., objects that are moving). This advantageously makes it possible to increase the efficiency in the data transmission even further.

In another specific embodiment, an environmental sensor system is provided; in particular, the environmental sensor system is included by the device for operating a vehicle, especially by a vehicle. According to a specific embodiment, the environmental sensor system includes one or a plurality of environmental sensor(s). An environmental sensor, for example, is a radar sensor, an ultrasonic sensor, a lidar sensor, a laser sensor, or a video sensor.

According to a specific embodiment, an environmental sensor system is provided for the sensor-based detection of a vehicle environment; in addition, a processor is provided, which is designed to detect a mobile object in the vehicle environment on the basis of the sensor-based detection, to determine a position of the mobile object, and to ascertain positional data that correspond to the position. The communication interface is designed to transmit the positional data via the communication network to a user of the communication network.

This provides the specific technical advantage that users of the communication network obtain knowledge of the locations of mobile objects in the parking facility. The fact that the processor is designed to detect a mobile object in the vehicle environment with the aid of sensors in particular means that the environmental sensor system supplies environmental sensor data in accordance with the sensor-based detection. The processor processes these data accordingly in order to detect one or more mobile object(s) in these environmental sensor data and to determine corresponding positions.

If the singular form is used for the term "object" within the meaning of this description, then the plural form is always meant to be included, and vice versa.

According to a specific embodiment, the processor furthermore is designed to predict a future movement of the mobile object based on the sensor detection, and to ascertain prediction data that correspond to the prediction; the communication interface is designed to transmit the prediction data via the communication network to a user of the communication network.

This provides the particular technical advantage that users of the communication network obtain knowledge of what the future movement of the mobile object might look like.

According to another specific embodiment, it is provided that the processor is developed to predict a future movement of the mobile object(s) based on the monitoring, and to ascertain prediction data that correspond to the prediction. The communication interface is designed to transmit the prediction data via the communication network to the user of the communication network.

According to another specific embodiment, it is provided that the processor is developed to integrate data allocated to the mobile object(s) as a dynamic layer into the digital map; the digital map includes a static layer which includes the positional data of one or more stationary object(s) located within the parking facility. The communication network is designed to transmit the dynamic layer separately from the static layer via the communication network to the user of the communication network.

According to an alternative specific embodiment, it is provided that the processor is designed to prepare another digital map based on the data allocated to the mobile object(s); the digital map includes positional data of one or more stationary object(s) that are located within the parking facility, and the communication interface is designed to transmit the additional separate map via the communication network to the user.

The two aforementioned specific embodiments, which are alternatives of each other, have advantages that are similar to those already discussed previously.

According to another specific embodiment, the communication interface is designed to exclusively transmit data allocated to the mobile object(s) to the user via the communication network during the autonomous navigation a vehicle that includes the user of the communication network in the parking facility.

This provides the particular technical advantage that because of the exclusive transmission of the data allocated to the mobile objects to the user, in particular the vehicle, a bandwidth and/or a transmission capacity of the communication network is/are able to be used in an especially efficient manner. In particular, a data volume to be transmitted may be reduced or lessened in this way.

The data allocated to the mobile objects include the positional data and/or the prediction data, in particular.

Functionalities of the methods result analogously from corresponding functionalities of the device and vice versa. In other words, corresponding device features in particular result analogously from corresponding method features and vice versa.

According to a specific embodiment, the device for operating a parking facility is designed and set up for executing or carrying out the method for operating a parking facility.

In another specific embodiment, it is provided that the device for operating a vehicle is designed or set up for executing or carrying out the method for operating a vehicle.

According to an additional aspect, a vehicle is provided, which is designed or set up to execute or carry out the method for operating a vehicle. According to a specific embodiment, the vehicle includes the device for operating a vehicle.

According to a specific embodiment, the vehicle-external monitoring device includes one or a plurality of the following sensor(s): a video sensor, radar sensor, ultrasonic sensor, lidar sensor, and a laser sensor. In particular, the vehicle-external monitoring device includes one or a plurality of light barrier(s) and/or parking-bay or parking-position occupancy sensor(s).

The present invention is described in greater detail below based on preferred exemplary embodiments.

DETAILED DESCRIPTION OF EXAMPLE EMBODIMENTS

Figure 1:
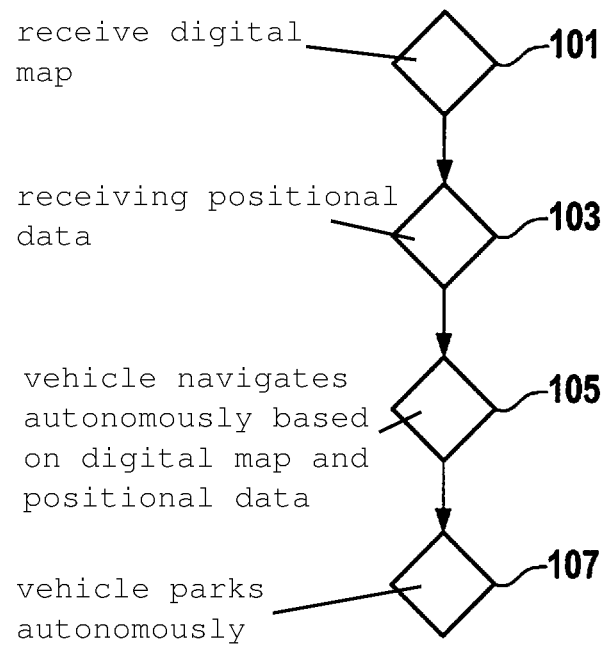
FIG. 1 shows a flow diagram of a method for operating a vehicle.

FIG. 1 shows a flow diagram of a method for operating a vehicle.

In a step 101, it is provided that the vehicle receives a digital map of a parking facility and at least one target position in the parking facility via a communication network. According to a step 103, it is provided that the vehicle receives positional data of one or a plurality of mobile object(s) that are located within the parking facility via the communication network. In other words, the vehicle receives the positions of the mobile objects that are located within the parking facility.

In a step 105, it is provided that the vehicle navigates autonomously in the parking facility to the target position based on the digital map and the positional data of the one or the plurality of mobile object(s). According to a step 107, the vehicle parks autonomously at the target position.

According to a specific embodiment, the target position is a parking position.

According to a specific embodiment, the vehicle drives from a drop-off position to the target position.

According to another specific embodiment, the vehicle drives from the target position back to the drop-off position.

In general, the vehicle navigates autonomously in the parking facility based on the digital map and the data that are allocated to the mobile object(s), i.e., positional data and/or prediction data, for example.

Figure 2:
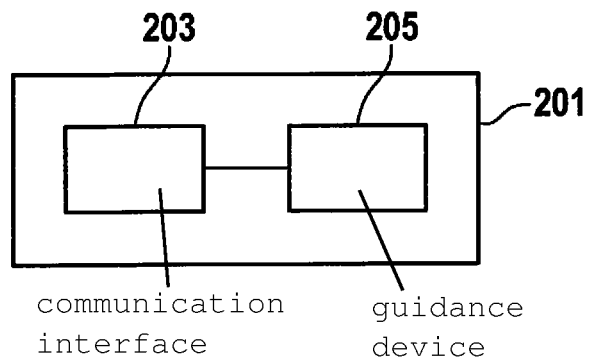
FIG. 2 shows a device for operating a vehicle.

FIG. 2 shows a device 201 for operating a vehicle.

Device 201 includes a communication interface 203, which is designed to receive a digital map of a parking facility and a target position in the parking facility via a communication network. Communication interface 203 is furthermore developed to receive positional data of a mobile object or a plurality of mobile objects located within the parking facility via the communication network.

In addition, device 201 includes a guidance device 205, which is developed to guide the vehicle autonomously in the parking facility to the target position based on the digital map and the positional data of the mobile object(s), and to park the vehicle autonomously at the target position.

In another specific embodiment, device 201 includes an environmental sensor system for a sensor-based detection, or for the sensor-based detection of a vehicle environment. The environmental sensor system has one or a plurality of environmental sensor(s), for example.

Figure 3:
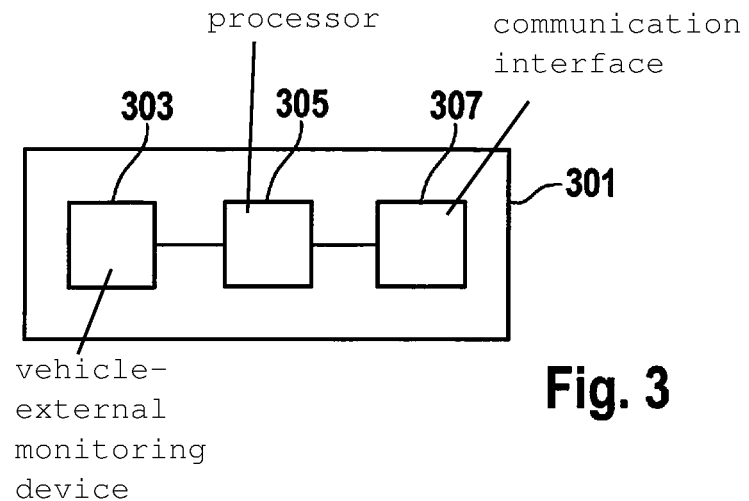
FIG. 3 shows a device for operating a parking facility.

FIG. 3 shows a device 301 for operating a parking facility.

Device 301 includes a vehicle-external monitoring device 303 for monitoring the parking facility. In addition, device 301 includes a processor 305, which is designed to detect one or more mobile object(s) within the parking facility based on the monitoring, to determine a position of the mobile object(s), and to ascertain positional data corresponding to the position. Moreover, device 301 includes a communication interface 307, which is designed to transmit a digital map of the parking facility and the positional data via a communication network to a user of the communication network.

For example, the user is device 201 from FIG. 2 or a terminal device, in particular a mobile terminal device, or it is the vehicle.

Communication interface 307 is preferably designed to transmit the digital map and the positional data to a plurality of users.

In a specific embodiment, communication interface 307 is developed to receive positional data and/or prediction data that are allocated to one or a plurality of mobile object(s), from a user. Such data, for example, may be ascertained with the aid of vehicles that navigate autonomously in the parking facility and sense their environment in the process, and may be sent to device 301.

Based on the received prediction data and/or positional data, processor 305 is then able to ascertain a dynamic layer of a digital map, or processor 305 ascertains an additional digital map on the basis of these data. In other words, processor 305 is designed accordingly.

Figure 4:
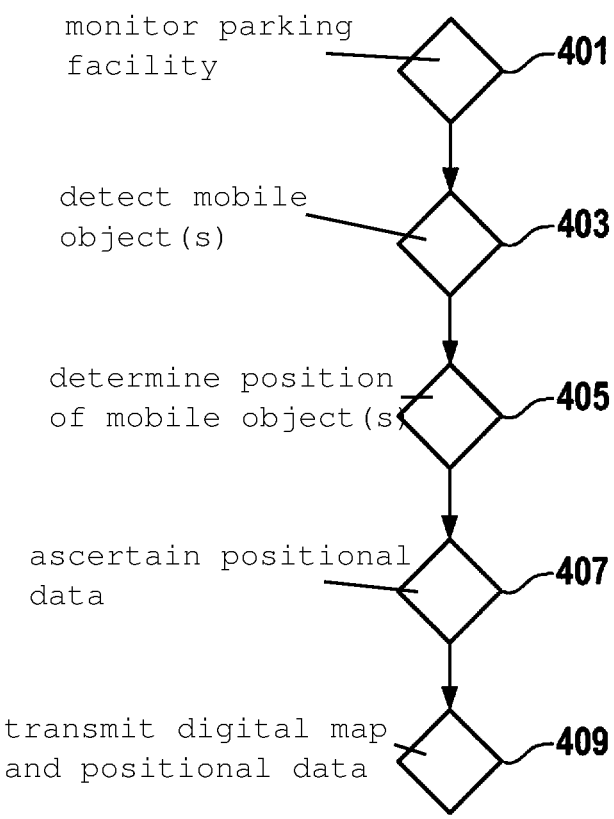
FIG. 4 shows a method for operating a parking facility.

FIG. 4 shows a flow diagram of a method for operating a parking facility.

According to a step 401, the parking facility is monitored, for instance by a vehicle-external monitoring system. In a step 403, one or more mobile object(s) is/are detected within the parking facility based on the monitoring. In a step 405, a position of the mobile object(s) is determined. In a step 407, positional data that correspond to the position are ascertained. According to a step 409, it is provided that a digital map of the parking facility and the positional data are transmitted via a communication network to a user or to a plurality of users of the communication network.

In a specific embodiment, it is provided that positional data and/or prediction data are received by one or a plurality of user(s) of the communication network, and a dynamic layer of a digital map or an additional map is set up based on the received data.

In summary, the present invention introduces a technical and efficient way by which dynamic or mobile objects are taken into account in a fully automated (autonomous) valet parking operation. Here, the present invention in particular includes also integrating the dynamic objects into the digital map of the parking facility, e.g., the parking garage; the map is then able to be made available with the aid of the device for operating a parking facility.

According to a specific embodiment, the device for operating a parking facility is encompassed by a parking-lot management system or a parking-lot administration system, in particular a parking-garage management system or a parking-garage administration system.

A specific embodiment provides for the use of different layers, i.e., one layer for the static components (stationary objects), and one layer for the dynamic components (mobile objects). As a result, it is usually sufficient to transmit the static layer to the vehicles only once.

According to a specific embodiment, the dynamic layer is transmitted to the vehicles on a regular basis, i.e., periodically, for example. In a specific embodiment, only the particular parts of the layer (i.e., data of the mobile objects) that pertain to the respective vehicle. In other words, according to a specific embodiment, a vehicle receives or is sent only the particular information about mobile objects that is relevant for the navigation of this particular vehicle. For example, the vehicle usually need not receive information about mobile objects if these mobile objects are located on the fifth level of a parking garage while the vehicle itself is navigating on the ground level and parks there.

As an alternative, two digital maps are used according to a specific embodiment, one for the static components and one for the dynamic components.

The dynamic map or layer is preferably "fed" by two sources and thus receives its data from two sources. Once from the vehicles (e.g., with the aid of the vehicle-external environmental sensor system), and once from a vehicle-external monitoring system (e.g., on the basis of video cameras or the monitoring system, among others) of the parking garage/parking-lot management system, generally the device for operating a parking facility.

In the process, the monitoring system detects all objects and their movements, for instance. In addition, it preferably calculates the probable movements of the objects in the future (prediction).

According to a specific embodiment, during the navigation, the vehicles transmit their own movements as well as the dynamic objects (vehicles, persons, animals, . . . )

detected by their sensors to the device for operating a parking facility, so that the device is able to integrate, or integrates, the corresponding data into the digital map. The probable movements of the dynamic objects are able to be calculated inside the vehicle, for example, and/or by the parking garage/parking-lot management system, for instance.

In other words, the map or the layer includes not only the current movements of the dynamic objects (vehicles, persons, . . . ) but also the probable movements in the future.

What is claimed is:

1. A method for operating a vehicle, comprising:
   receiving, by the vehicle via a communication network, a digital map of a parking facility and at least one target position in the parking facility;
   receiving, by the vehicle via the communication network, positional data of at least one mobile object located within the parking facility;
   autonomously navigating, by the vehicle, in the parking facility to the target position based on the digital map and the positional data of the at least one mobile object; and
   autonomously parking, by the vehicle, at the target position,
   wherein prediction data of future movements of the at least one mobile object, allocated to the at least one mobile object, are received by the vehicle via the communication network, so that the vehicle navigates autonomously in the parking facility based on the future movements of the at least one mobile object.

2. The method as recited in claim 1, wherein the vehicle detects its environment with sensors, and if a mobile object is detected on the basis of the sensor-based detection, the vehicle determines a position of the mobile object and transmits positional data that correspond to the position via the communication network to a user of the communication network.

3. The method as recited in claim 1, wherein the vehicle, during its navigation in the parking facility, transmits positional data that correspond to a current position of the vehicle via the communication network to a user of the communication network.

4. The method as recited in claim 1, wherein the vehicle transmits route data corresponding to a scheduled route of the vehicle via the communication network to a user of the communication network during navigation of the vehicle in the parking facility.

5. The method as recited in claim 1, wherein the data allocated to the at least one mobile object are included by a dynamic layer of the digital map, and the digital map has a static layer that includes positional data of at least one stationary object located within the parking facility.

6. The method as recited in claim 1, wherein the data allocated to the at least one mobile object are included in an additional digital map, the digital map including positional data of at least one stationary object located within the parking facility.

7. The method as recited in claim 1, wherein the digital map includes a single layer that encompasses data allocated to the at least one mobile object and positional data of at least one stationary object located within the parking facility.

8. A method for operating a vehicle, comprising:
   receiving, by the vehicle via a communication network, a digital map of a parking facility and at least one target position in the parking facility;

receiving, by the vehicle via the communication network, positional data of at least one mobile object located within the parking facility;

autonomously navigating, by the vehicle, in the parking facility to the target position based on the digital map and the positional data of the at least one mobile object; and autonomously parking, by the vehicle, at the target position, wherein the data allocated to the at least one mobile object are included by a dynamic layer of the digital map, and the digital map has a static layer that includes positional data of at least one stationary object located within the parking facility, wherein the dynamic layer includes a plurality of dynamic sub-layers, and one of the sub-layers includes data that are allocated to mobile objects having a speed of 0 m/s, and another one of the sub-layers includes data that are allocated to mobile objects having a speed that is greater than 0 m/s.

9. A device for operating a vehicle, comprising:
a communication interface designed to receive a digital map of a parking facility and a target position in the parking facility via a communication network, the communication interface further designed to receive positional data of at least one mobile object located within the parking facility via the communication network;
a guidance device designed to guide the vehicle autonomously in the parking facility to the target position based on the digital map and the positional data of the at least one mobile object, and to park the vehicle autonomously at the target position;
an environmental sensor system for the sensor-based detection of a vehicle environment; and
a processor designed to detect a mobile object in the vehicle environment based on the sensor-based detection, to determine a position of the mobile object, and to ascertain positional data that correspond to the position;
wherein the communication interface is designed to transmit the positional data via the communication network to a user of the communication network,
wherein the processor is designed to predict a future movement of the mobile object on the basis of the sensor-based detection, and to ascertain prediction data that correspond to the prediction, and the communication interface is designed to transmit the prediction data via the communication network to a user of the communication network.

10. A device for operating a parking facility, comprising:
a vehicle-external monitoring device for monitoring the parking facility;
a processor designed to detect at least one mobile object within the parking facility based on the monitoring, to determine a position of the at least one mobile object, and to ascertain positional data that correspond to the position; and
a communication interface designed to transmit a digital map of the parking facility and the positional data via a communication network to a user of the communication network,
wherein the processor is designed to predict a future movement of the at least one mobile object based on the monitoring, and to ascertain prediction data that correspond to the prediction, and the communication interface is designed to transmit the prediction data via the communication network to the user of the communication network.

11. The device as recited in claim 10, wherein the communication interface is designed to receive positional data of at least one mobile object located within the parking facility via the communication network.

12. The device as recited in claim 10, wherein the processor is designed to integrate the data allocated to the at least one mobile object as a dynamic layer into the digital map, and the digital map has a static layer, which includes positional data of at least one stationary object located within the parking facility, and the communication interface is designed to transmit the dynamic layer separately from the static layer via the communication network to the user of the communication network.

13. A device for operating a parking facility, comprising:
a vehicle-external monitoring device for monitoring the parking facility;
a processor designed to detect at least one mobile object within the parking facility based on the monitoring, to determine a position of the at least one mobile object, and to ascertain positional data that correspond to the position; and
a communication interface designed to transmit a digital map of the parking facility and the positional data via a communication network to a user of the communication network,
wherein the processor is designed to prepare an additional digital map based on the data allocated to the at least one mobile object, and the digital map includes positional data of at least one stationary object located within the parking facility, and the communication interface is designed to transmit the additional separate map via the communication network to the user.

14. The device as recited in claim 13, wherein the communication interface is designed to transmit exclusively data that are allocated to the at least one mobile object to the user via the communication network during an autonomous navigation of a vehicle that includes the user of the communication network in the parking facility.

15. A method for operating a parking facility, comprising:
monitoring the parking facility;
detecting at least one mobile object within the parking facility based on the monitoring, determining a position of the at least one mobile object, and ascertaining positional data that correspond to the position; and
transmitting a digital map of the parking facility and the positional data via a communication network to a user of the communication network,
wherein prediction data of future movements of the at least one mobile object, allocated to the at least one mobile object, are received by the vehicle via the communication network, so that the vehicle navigates autonomously in the parking facility based on the future movements of the at least one mobile object.

16. A non-transitory computer-readable storage medium on which is stored a computer program for operating a vehicle, the computer program, when executed by a computer, causing the computer to perform:
receiving, by the vehicle via a communication network, a digital map of a parking facility and at least one target position in the parking facility;
receiving, by the vehicle via the communication network, positional data of at least one mobile object located within the parking facility;

autonomously navigating, by the vehicle, in the parking facility to the target position based on the digital map and the positional data of the at least one mobile object; and autonomously parking, by the vehicle, at the target position, wherein prediction data of future movements of the at least one mobile object, allocated to the at least one mobile object, are received by the vehicle via the communication network, so that the vehicle navigates autonomously in the parking facility based on the future movements of the at least one mobile object.

* * * * *